United States Patent [11] 3,624,060

[72] Inventor William Allen Judy
 Akron, Ohio
[21] Appl. No. 795,693
[22] Filed Jan. 31, 1969
[45] Patented Nov. 30, 1971
[73] Assignee The Goodyear Tire & Rubber Company
 Akron, Ohio

[54] BINARY CATALYST SYSTEMS FOR THE POLYMERIZATION OF UNSATURATED ALICYCLIC MONOMERS
 12 Claims, No Drawings

[52] U.S. Cl. .................................... 260/88.2,
 260/80.78, 260/82.1, 260/93.1, 260/94.3
[51] Int. Cl. ........................................ C08f 19/04
[50] Field of Search ............................ 260/93.1,
 88.2, 80.78

[56] References Cited
 UNITED STATES PATENTS

| | | | |
|---|---|---|---|
| 3,074,918 | 1/1963 | Eleuterio .................. | 260/93.1 |
| 3,449,310 | 6/1969 | Dall'Asta et al. ............ | 260/93.1 |
| 3,458,489 | 7/1969 | Natta et al. .................. | 260/93.1 |
| 3,459,725 | 8/1969 | Natta et al. .................. | 260/93.1 |
| 3,462,403 | 8/1969 | Pendleton .................... | 260/93.7 |
| 3,476,728 | 11/1969 | Natta .......................... | 260/93.1 |

OTHER REFERENCES

Gaylord et al., " Linear & Stereoregular Addition Polymers," Interscience Publishers N. Y., N. Y. (1959) pp. 93–97

*Primary Examiner*—Joseph L. Schoter
*Assistant Examiner*—Richard A. Gaither
*Attorneys*—F. W. Brunner and J. Y. Clowney

ABSTRACT: There is disclosed a process for the ring opening polymerization of certain unsaturated alicyclic compounds such as cyclobutene, cyclopentene, cyclooctene, cyclooctadiene and the like which comprises subjecting such compounds to a two component catalyst system, the first component being an alkali metal compound of tungsten hexahalide or an alkyl amine derivative of tungsten hexahalide; the second component being an aluminum alkyl, an aluminum halide, an aluminum alkyl hydride or a tin alkyl halide.

BINARY CATALYST SYSTEMS FOR THE POLYMERIZATION OF UNSATURATED ALICYCLIC MONOMERS

This invention relates to a process for polymerizing unsaturated alicyclic compounds and to the products resulting therefrom. In its broad aspect, the invention is directed to the preparation of polymers derived from unsaturated alicyclic compounds which contain at least one alicyclic ring structure containing at least two carbon atoms connected through a double bond.

The polymerization process of this invention may be used to prepare novel solid polymers. The properties and characteristics of these polymers can be "tailor made" to fit a wide variety of uses and fields of application. The properties of the polymers resulting from the polymerization process of this invention can be varied over a wide range depending on (1) the particular unsaturated alicyclic monomer chosen to be polymerized, (2) the particular polymerization catalyst employed and (3) the particular polymerization conditions employed. The products resulting from the polymerization of this invention can be employed in a variety of applications; for example, when they are elastomeric in nature, they may be employed to produce finished rubber articles such as pneumatic tires, molded goods and the like or when they are plastic in nature, they may be materials which are useful to manufacture articles such as films and fibers and also useful to form finished products by molding techniques.

This invention comprises the ring opening polymerization of at least one unsaturated alicyclic compound selected from the group consisting of (1) unsaturated alicyclic compounds containing at least four and not more than five carbon atoms in the cyclic ring and containing one carbon to carbon double bond in the cyclic ring and (2) unsaturated alicyclic compounds containing at least 8 carbon atoms in the cyclic ring and containing at least one carbon to carbon double bond in the cyclic ring by subjecting said alicyclic compounds to ring opening polymerization conditions in the presence of a catalyst system comprising (A) at least one material selected from a class consisting of compounds of the general formulas:

1 $MWX_6$ and
2 $[(R_1)(R_2)(R_3)(R_4)N]WX_6$

Wherein M is a metal selected from the group consisting of potassium, rubidium, cesium and thallium; $R_1$, $R_2$, $R_3$ and $R_4$ represent at least one alkyl group containing from one to two carbon atoms; W represents tungsten; N represents nitrogen and X represents a member of a group consisting of chloride and bromide ions and (B) at least one metal compound selected from a group consisting of compounds of the general formulas:

(1) $R_nAlX_{3-n}$ wherein $n$ is an integer from 0 to 3,
(2) $R_nAlH_{3-n}$ wherein $n$ is an integer from 1 to 2 and
(3) $R_nSnX_{4-n}$ wherein $n$ is an integer from 0 to 4 and also wherein R represents alkyl, aryl, alkaryl and aralkyl groups; Al represents aluminum, Sn represents tin; H represents hydrogen and X represents halogen.

Representative examples of the compound selected from a group of compounds having the formula $MWX_6$ useful as the first or (A) catalyst component of this invention includes potassium hexachlorotungstate, potassium hexabromotungstate, rubidium hexachlorotungstate, rubidium hexabromotungstate, cesium hexachlorotungstate, cesium hexabromotungstate, thallium hexachlorotungstate and thallium hexabromotungstate.

Representative examples of the compound selected from a group of compounds having the formula:

$[(R_1)(R_2)(R_3)(R_4)N]WX_6$ useful as the first or (A) catalyst component of this invention include tetramethylammonium hexachlorotungstate, tetramethylammonium hexabromotungstate, tetraethylammonium hexachlorotungstate, tetraethylammonium hexabromotungstate, dimethyldiethylammonium hexachlorotungstate, dimethyldiethylammonium hexabromotungstate and the like. The most preferred material useful as the first or (A) catalyst component of this invention is potassium hexachlorotungstate.

The metal compound useful as the second or (B) catalyst component may be defined by the general formula:

$R_nAlX_{3-n}$ where $n$ is an integer from 0 to 3 and includes aluminum halides; alkyl, aryl, alkaryl and aralkyl aluminum halides and dihalides and trialkyl, triaryl, trialkaryl and triaralkyl aluminum compounds. Representative examples of such compounds include aluminum chloride, aluminum bromide, ethylaluminum dichloride, ethylaluminum dibromide, n-propylaluminum dichloride, isobutylaluminum diiodide, phenylaluminum dibromide, tolylaluminum dibromide, phenylaluminum diiodide, tolylaluminum diiodide, benzylaluminum dibromide, diethylaluminum chloride, di-n-propylaluminum chloride, diisobutylaluminum chloride, diethylaluminum bromide, diethylaluminum iodide, diethylaluminum fluoride, diphenylaluminum chloride, ditolylaluminum chloride, dibenzylaluminum bromide, trimethylaluminum, triethylaluminum, tri-n-propylaluminum, trihexylaluminum, triphenylaluminum, tritolylaluminum, tribenzylaluminum and the like.

The metal compound useful as the second or (B) catalyst component may be defined by the general formula:

$R_nAlH_{3-n}$ where $n$ is an integer from 1 to 2 and includes alkyl, aryl, alkaryl and aralkyl aluminum hydrides and dihydrides. Representative examples of such compounds include diphenylaluminum hydride, diethylaluminum hydride, dimethylaluminum hydride, diisobutylaluminum hydride, phenylaluminum dihydride, ethylaluminum dihydride, di-n-propylaluminum hydride and the like.

The metal compound useful as the second or (B) catalyst component is defined by the formula:

$R_nSnX_{4-n}$ where $n$ is an integer from 0 to 4 and includes tetraalkyl, tetraaryl, tetraalkaryl and tetraaralkyl tin compounds; alkyl, aryl, alkaryl and aralkyl tin halides, dihalides and trihalides and tin halide compounds. Representative examples of such compounds include tetraethyltin, tetramethyltin, tetraphenyltin, tetratolyltin, triethyltin chloride, triisoamyltin chloride, triphenyltin chloride, tribenzyltin chloride, diethyltin dichloride, diethyltin difluoride, methyltin trichloride, tin tetrachloride, tin tetrabromide and the like.

The catalysts employed in this invention are prepared by mixing the components by known techniques. Thus, the catalysts may be prepared by "preformed" or "in situ" techniques. By "preformed" is meant the manner in which the catalyst components are mixed together prior to exposure of any of the catalyst components to the monomer to be polymerized. By "in situ" is meant that the catalyst components are added separately to the monomer to be polymerized. The catalyst components can be mixed either as pure compounds or as suspensions or solutions in liquids which do not adversely affect the ring opening polymerization. While the presence of the monomer is not essential during the formation of an active catalyst species by a mixing of (A) and (B) and this fact facilitates the use of "preformed" catalysts, it has been found that freshly "preformed" catalysts are generally more active than catalysts which have been allowed to age before use.

The amount of catalyst employed may be varied over a wide range of concentrations. Any establishment of an arbitrary catalytic concentration for one of the catalyst components will determine the relative concentrations of the remaining catalyst component. Thus, the relative concentrations of the catalyst components, (A) and (B), are interdependent. This interdependency of the catalyst components (A) and (B) also depends on a number of other factors such as temperature, reactant used, purity of reactant, reaction times desired and the like. Of course, a catalytic amount, about $5\times10^{-5}$ moles, of catalyst must be employed and those skilled in the art will be readily able to determine the optimum catalytic range.

It has been found that successful results are obtained in the practice of this invention when the molar relationship between the catalyst components (A) and (B), as previously defined, are within a molar ratio of A/B ranging from 0.01/1.0 to about 5.0/1.0.

Various unsaturated alicyclic compounds may be employed in the practice of this invention. As is mentioned above, unsaturated alicyclic compounds containing at least four and not more than five carbons atoms in the cyclic ring which contain one carbon-to-carbon double bond in the cyclic ring and unsaturated alicyclic compounds containing at least eight carbon atoms in the cyclic ring which contain at least one carbon-to-carbon double bond in the cyclic ring are operable in this invention.

The preferred unsaturated alicyclic compounds of this invention are those comprising a single unsaturated alicyclic ring. These alicyclic rings may be mono- or multisubstituted by such groups as alkyl, aryl, arylalkyl and halogen groups.

Representative examples of unsaturated alicyclic compounds containing a single alicyclic ring having at least four and not more than five carbon atoms in the cyclic ring and containing one double bond in said ring are cyclobutene and cyclopentene. Representative examples of compounds having at least eight carbon atoms in the cyclic ring and having from one to two double bonds in said ring are cyclooctene; 1,4- and 1,5-cyclooctadiene. Representative of compounds having nine carbon atoms and one to three double bonds in the ring are cyclononene, 1,4- and 1,5--cyclononadiene and 1,4,7-cyclononatriene. Representative of compounds having 10 carbon atoms and one to three double bonds in the ring are cyclodecene, 1,4-, 1,5- and 1,6-cyclodecadiene and 1,4,6- and 1,4,7-carbon atoms and one to three double bonds in the ring are cycloundecene, 1,4-, and 1,6-cycloundecadienes and 1,4,7- and 1,4,8-cycloundecatriene. Representative of compounds having 12 carbon atoms and one to three double bonds in the ring are cyclododecene, 1,4-, 1,5-, 1,6-, and 1,7-cyclododecadiene and 1,4,7-, 1,4,8-, 1,4,9- and 1,5,9-cyclododecatriene.

The most preferred unsaturated alicyclic compounds of this invention are those containing from one to three carbon-to-carbon double bonds in the ring and in which the double bonds are located in relation to each other in a manner that they are not adjacent and are nonconjugated. Representative examples of such preferred materials are cyclobutene, cyclopentene, cyclooctene, cyclododecene and 1,5-cyclooctadiene and 1,5,9-cyclododecatriene.

Still another class of preferred unsaturated alicyclic monomers are those containing one carbon-to-carbon double bond in the ring of at least four and not more than five carbon atoms, examples of which are cyclobutene and cyclopentene. Another group which are preferred are those which have at least eight carbon atoms in the ring and not more than 12 carbon atoms in the ring and contain one, two or three carbon-to-carbon double bonds in said ring, examples of which are previously set forth.

Representative examples of substituted unsaturated alicyclic compounds are alkyl-substituted compounds such as 1,5,9-trimethylcyclododecatriene; aryl-substituted compounds such as 3-phenylcyclooctene-1; aralkyl-substituted compounds such as 3 -benzylcyclooctene-1; alkaryl-substituted compounds such as 3-methylphenylcyclooctene-1; halogen-substituted compounds wherein the halogens are iodine, chlorine, bromine and fluorine such as 5-chlorocyclooctene-1; 3-bromocyclooctene-1, 5-chlorocyclododecene-1 and 5,6-dichlorocyclooctene-1. Mixtures of the unsaturated alicyclic compounds may be polymerized including both substituted unsaturated alicyclic compounds and the unsubstituted unsaturated alicyclic compounds.

The polymerizations of this invention may be conducted in solution or in bulk. When the polymerization is carried out in solution, solvents which do not adversely affect the polymerization are desired. Representative of useful solvents are liquid aromatic hydrocarbons such as benzene and toluene; hydrogenerated aromatic hydrocarbons such as tetralin; liquid aliphatic hydrocarbons such as pentane, heptane, hexane, petroleum ether, decane; and alicyclic hydrocarbons such as cyclohexane, decalin and cyclooctane. Mixtures of such solvents may also be used.

Temperatures at which the polymerization reaction is carried out can be varied over a wide range. Usually the temperature can be varied from extremely low temperatures such as −60° C. up to high temperatures such as 150° C. or higher. Thus, the temperature is not a critical factor of the invention. It is generally preferred, however, to conduct the reaction at a temperature in the range of from about −20° C. to about 80° C. The pressure at which the polymerization is carried out can also be varied over a wide range. The reaction can be conducted at atmospheric pressure or, if desired, it can be carried out at subatmospheric pressure or superatmospheric pressure. Generally a satisfactory polymerization is obtained when the reaction is carried out at about autogenous pressure, developed by the reactants under the operating conditions used.

The polymerization time will vary and can range from a few seconds to 24 hours or more, depending upon the polymerization conditions and the degree and extent of polymerization desired.

The polymerization reaction may be carried out as a batch or as a continuous process. In preforming the polymerizations of this invention, the introduction of the monomer, catalyst and solvent, when a solvent is employed, can each be made to the reaction zone alternately, intermittently, and/or continuously.

It is thought that the polymerizations of this invention take place through a ring-opening polymerization mechanism. Such ring-opening polymerizations of unsaturated alicyclic compounds can be used to make a number of alternating copolymers and terpolymers that have not been capable of being made before. For example, the ring-opening polymerization of cyclooctene yields a polyoctenamer which may be considered the alternating copolymer of one butadiene unit and two ethylene units.

The ring opening polymerization of cyclooctadiene-1,5 leads to a polybutenamer which is equivalent to the 1,4 addition polymer of butadiene-1,3. In practicing this invention, polybutenamers can be formed whose structure comprises alternating cis and transvinylene groups in successive polymeric repeat units which is equivalent to the polymer which may be obtained by the 1,4-addition polymerization of butadiene-1,3 in which successive butadiene-1,3 units alternately occur in cis- and transconfigurations. Such a polymer could be considered an alternating copolymer of cis and trans 1,4 poly(butadiene-1,3).

The ring opening polymerization of 5-methylcyclooctene-1 would yield the alternating terpolymer of butadiene-1,3, propylene and ethylene; likewise, 5-phenylcyclooctene-1 would yield the alternating terpolymer of butadiene-1,3, styrene and ethylene. The ring opening polymerization of 5-methylcyclooctadiene-1,5 would yield the alternating copolymer of butadiene-1,3 and isoprene. The ring opening polymerization of substituted cyclododecenes can yield even more complicated alternating copolymers, terpolymers and even quadripolymers.

Ring opening polymerization also allows one to make copolymers and terpolymers that have not heretofore been made by ordinary addition polymerizations. A representative example of such a polymerization is the ring-opening polymerization of cyclononene which yields the perfectly alternating copolymer of butadiene-1,3 and pentamethylene.

Ring opening polymerization of halogen-substituted unsaturated alicyclic monomers also leads to interesting copolymers and terpolymers; for instance, 5-chlorocyclooctene-1 would lead to a polymer equivalent to an alternating interpolymer of butadiene-1,3 plus vinyl chloride and ethylene; 3-bromocyclooctene-1 would yield a polymer equivalent to an alternating interpolymer of ethylene plus 1-bromobutadiene-1,3 and ethylene and 5-chlorocyclododecene-1 would lead to a polymer equivalent to an alternating interpolymer of butadiene-1,3 plus vinyl chloride and 3 ethylene molecules.

Ring opening polymerization of unsaturated alicyclic hydrocarbons containing at least four and not more than five carbon atoms and containing one carbon-to-carbon double bond in the cyclic ring and those containing eight carbon atoms and at least one carbon-to-carbon double bond in the cyclic ring produces high molecular weight polymers which have a high degree of resistance to oxidation.

Bulk polymerizations may be desirable from a process standpoint as relatively little heat appears to be evolved per mole of unsaturated alicyclic monomer polymerized in practicing this invention. This constitutes a great advantage for this ring opening type of polymerization over conventional addition polymerization.

The low volume decrease accompanying a ring-opening polymerization is another major advantage over conventional addition polymerization, particularly where these monomers are bulk polymerized to form potting compounds and various articles, examples of which are molded plastic materials, molded rubberlike goods, shoe soles and heels, industrial belts and vehicle tires.

In these applications the monomer may be polymerized in the presence of one or more reinforcing carbon blacks, pigments or resins and certain antioxidants. The products made by this procedure may be cross-linked by adding polymerizable polyfunctional compounds, for example, bicyclopentadiene, to the main monomer. The molded products made by ring-opening polymerization may be cross-linked by exposure to ionizing radiation such as gamma rays, X-rays, or electrons. These molded products may also be cross-linked or vulcanized by incorporating certain compounds which on heating during or subsequent to the polymerization will lead to conventional cross-linking or vulcanization of these polymers.

The polymerization reaction may be terminated by incorporating various compounds which, upon heating, release materials which deactivate the catalyst. Representative examples of such compounds are the ammonia salts such as ammonium chloride, ammonium carbonate, ammonium acetate, ammonium oleate, ammonium sulfate and ammonium phosphate; other ammonia-releasing compounds such as tetraalkyl ammonium halides, e.g., tetramethyl ammonium chloride, water-releasing agents such as salts with water of crystallization, examples of which are: $Al_2(SO_4)\cdot 17\ H_2O$; $NH_4Al(SO_4)_2\cdot 12\ H_2O$; $FeSO_4\cdot 7\ H_2O$; $MgHPO_4\cdot 7\ H_2O$; $KAL(SO_4)_2 12\ H_2O$; $KNaCO_3\cdot 6\ H_2O$; $Na_2B_4O_7\cdot 10\ H_2O$; $Na_2CO_3{}^{bl}10\ H_2O$; $NaHPO_4\cdot 12\ H_2O$; $Na_2So_4\cdot 10\ H_2O$; and $ZnNO_3\cdot 6\ H_2O$.

The following examples are set forth to further illustrate the nature of this invention. However, it should be understood that the examples are set forth for illustrative and not for limitative purposes. All experiments were conducted in an atmosphere of nitrogen unless noted otherwise.

EXAMPLE I

A series of polymerizations was carried out using 17.0 grams (g.) of freshly distilled cyclooctene and 80 milliliters (ml.) of dry benzene in each polymerization. All manipulations of charging monomer, solvent and catalyst components were conducted under a nitrogen atmosphere. The catalyst components were used as a 0.10 molar (M) slurry of potassium hexachlorotungstate ($KWCl_6$) in benzene, a 0.20 M slurry of finely divided aluminum chloride ($AlCl_3$) in cyclohexane, a 0.20 M slurry of finely divided aluminum bromide ($AlBr_3$) in cyclohexane and a 0.20 M solution of ethylaluminum dichloride (EADC) in benzene. All polymerizations were commenced by first injecting $2\times 10^{-4}$ moles of $KWCl_6$ into each polymerization bottle followed by the immediate injection of the (B) catalyst components in amounts as listed in the table below. Termination was accomplished by injecting 5 ml. of a 10 percent by weight solution of ditertiary butyl-p-cresol in a 50/50 mixture of methanol and benzene.

| Experiment Number: | Cocatalyst | Moles $\times 10^4$ | Polymerization time, hrs. | Weight percent yield |
|---|---|---|---|---|
| 1 | EADC | 2 | 1 | 45 |
| 2 | EADC | 4 | 20 | 17 |
| 3 | $AlCl_3$ | 6 | 0.5 | 82 |
| 4 | $AlBr_3$ | 4 | 0.5 | 75 |

While certain representative embodiments and details have been shown for the purpose of illustrating the invention, it will be apparent to those skilled in the art that various changes and modifications may be made therein without departing from the spirit or scope of the invention.

We claim:

1. A process comprising a ring-opening polymerization of at least one unsaturated alicyclic compound selected from the group consisting of (1) unsaturated alicyclic compound containing four to five carbon atoms in the cyclic ring and containing one carbon to carbon to carbon double bond in the cyclic ring and (2) unsaturated alicyclic compounds containing eight to twelve carbon atoms inclusive in the cyclic ring and containing at least one carbon to carbon double bond in the cyclic ring, by subjecting said alicyclic compounds to ring opening polymerization conditions, in the presence of a catalyst system comprising (A) at least one material selected from a class consisting of compounds of the general formulas:
   1. $MWX_6$ and
   2. $WX_6$ wherein M is a metal selected from the group consisting of potassium, rubidium, cesium and thallium; $R_1$, $R_2$, $R_3$ and $R_4$ represent at least one alkyl group containing from one to two carbon atoms; W represents tungsten; N represents nitrogen and X represents a member of a group consisting of chloride and bromide ions and (B) at least one metal compound selected from a group consisting of compounds of the general formulas:
   1. $R_nAlX_{3-n}$ wherein $n$ is an integer from 0 to 3,
   2. $R_nAlH_{3-n}$ wherein $n$ is an integer from 1 to 2 and
   3. $R_nSnX_{4-n}$ wherein $n$ is an integer from 0 to 4 and also wherein R represents alkyl, aryl, alkaryl and aralkyl groups; Al represents aluminum, Sn represents tin, H represents hydrogen and X represents halogen.

2. A process according to claim 1 in which the molar relationship between the catalyst components defined by (A) and (B) are within the molar ratio of A/B ranging from about 0.01/1.0 to about 5.0/1.0.

3. A process according to claim 1 in which the (A) catalyst component is potassium hexachlorotungstate.

4. A process according to claim 1 in which the organometallic or (B) catalyst component is an alkyl aluminum halide.

5. A process according to claim 1 in which the (B) catalyst component is an aluminum halide compound.

6. A process according to claim 1 in which the unsaturated alicyclic compound contains four to five carbon atoms in the cyclic ring and only one carbon to carbon double bond in the cyclic ring.

7. A process according to claim 1 in which the unsaturated alicyclic compound contains eight to 12 carbon atoms inclusive in the cyclic ring and contains from one to three carbon to carbon double bonds in the cyclic ring which are located in a relation to each other that they are not conjugated.

8. A process according to claim 1 in which cyclooctene is homopolymerized.

9. A process according to claim 1 in which cyclooctadiene is homopolymerized.

10. A process according to claim 1 in which cyclododecatriene is homopolymerized.

11. A process according to claim 1 in which cyclooctadiene and cyclododecatriene are copolymerized.

12. A process according to claim 1 in which the (A) catalyst component is potassium hexachlorotungstate and the (B) catalyst component is an aluminum halide.

PO-1050
(5/69)

UNITED STATES PATENT OFFICE
CERTIFICATE OF CORRECTION

Patent No. 3,624,060　　　　　　　　Dated November 30, 1971

Inventor(s) William Allen Judy

It is certified that error appears in the above-identified patent and that said Letters Patent are hereby corrected as shown below:

Claim 1, line 31, delete "$WX_6$" and insert
-- $[(R_1)(R_2)(R_3)(R_4)N]WX_6$ --

Signed and sealed this 23rd day of January 1973.

(SEAL)
Attest:

EDWARD M. FLETCHER, JR.　　　　　　　　ROBERT GOTTSCHALK
Attesting Officer　　　　　　　　　　　　Commissioner of Patents